(12) United States Patent
Zhang et al.

(10) Patent No.: US 8,135,181 B2
(45) Date of Patent: Mar. 13, 2012

(54) METHOD OF MULTI-MODAL BIOMETRIC RECOGNITION USING HAND-SHAPE AND PALMPRINT

(75) Inventors: Dapeng David Zhang, Kowloon (HK); Ajay Kumar, Kowloon (HK)

(73) Assignee: The Hong Kong Polytechnic University, Hung Hom, Kowloon (HK)

( * ) Notice: Subject to any disclaimer, the term of this patent is extended or adjusted under 35 U.S.C. 154(b) by 834 days.

(21) Appl. No.: 11/727,315

(22) Filed: Mar. 26, 2007

(65) Prior Publication Data

US 2008/0240514 A1 Oct. 2, 2008

(51) Int. Cl.
*G06K 9/00* (2006.01)
(52) U.S. Cl. .................................................... 382/115
(58) Field of Classification Search .................. 382/115, 382/127, 276, 308; 235/380; 340/5.1, 5.92, 340/5.52, 5.53, 5.82, 5.84; 704/246, 273; 902/3, 4, 25
See application file for complete search history.

(56) References Cited

U.S. PATENT DOCUMENTS

| | | | |
|---|---|---|---|
| 5,852,669 A | 12/1998 | Eleftheriadis et al. | |
| 6,182,058 B1 | 1/2001 | Kohavi | |
| 6,819,782 B1* | 11/2004 | Imagawa et al. | 382/115 |
| 2004/0057604 A1* | 3/2004 | David et al. | 382/115 |
| 2006/0078170 A1* | 4/2006 | Kamata et al. | 382/115 |

OTHER PUBLICATIONS

Kumar et al, "Integrating Shape and Texture for Hand Verification", Dec. 2004, IEEE, 4 pages total.*
Duta et al./ Matching of palmprints/ Pattern Recognition Letters 23/ 2002/ 477-485.
Kong et al./ Competitive Coding Scheme for Palmprint Verification/ Prodeedings of the 17th International Conference on Pattern Recognition (ICPR'04).
Wu et al./ Wavelet Based Palmprint Recognition/ Proceedings of the First International Conference on Machine Learning and Cybermetics/ Nov. 4-5, 2002/ Beijing.
Wu et al./ Palmprint Recognition Using Fisher's Linear Discriminant/ Proceeding of the Second International Conference on Machine Learning and Cybermetics/ Nov. 2-5, 2003/ Xi'an.
Ong et al./ A Single-sensor Hand Geometry and Palmprint Verification System/ WMBA '03/ Nov. 8, 2003.
McCallum et al./ A Comparison of Event Models for Naive Bayes Text Classification.
Ajay Kumar, David Zhang; Personal Recognition Using Hand Shape and Texture; IEEE Transactions on Image Processing, vol. 15, No. 8, Aug. 2006.

* cited by examiner

*Primary Examiner* — Brian Q Le
*Assistant Examiner* — Edward Park
(74) *Attorney, Agent, or Firm* — The Hong Kong Polytechnic University

(57) ABSTRACT

The present invention relates to a method and system for a multimodal biometric system utilizing a single image to generate hand shape and palmprint features. The invention utilizes a digital camera, and incorporates feature subset selection algorithms to eliminate redundant data. The inventions, through the use of feature algorithm, successfully fuses the hand shape features and palmprint features at the features level.

8 Claims, 5 Drawing Sheets

TABLE I
Comparative Performance Evaluation for the Palmprint Recognition

|  | Naive Bayes | | | KNN | SVM | | | FFM | Decision Tree | |
|---|---|---|---|---|---|---|---|---|---|---|
|  | Normal | Estimated | Multinomial |  | d=1 | d=2 | d=3 |  | C4.5 | LMT |
| 144 Feature | 69.4 | 74.4 | 91.8 | 94.4 | 95.2 | 95.8 | 95.8 | 95 | 50.6 | 94.6 |
| 69 Features | 68.8 | 75.4 | 92.8 | 95 | 94.4 | 95.6 | 95.5 | 94.8 | 50.2 | 93.8 |

FIG. 4a

TABLE II
Comparative Performance Evaluation for the Hand-Shape Recognition

|  | Naive Bayes | | | KNN | SVM | | | FFM | Decision Tree | |
|---|---|---|---|---|---|---|---|---|---|---|
|  | Normal | Estimated | Multinomial |  | d=1 | d=2 | d=3 |  | C4.5 | LMT |
| 23 Feature | 73.9 | 79 | 29 | 84.4 | 89 | 88.4 | 88.6 | 86.4 | 67 | 89.6 |
| 15 Features | 78.6 | 80 | 51.8 | 84.2 | 87 | 85.4 | 83.2 | 85 | 66.6 | 87.8 |

FIG. 4b

TABLE III
Comparative Performance Evaluation for the Combined Palmprint and Hand-Shape Features

|  | Naive Bayes | | | KNN | SVM | | | FFM | Decision Tree | |
|---|---|---|---|---|---|---|---|---|---|---|
|  | Normal | Estimated | Multinomial |  | D=1 | d=2 | d=3 |  | C4.5 | LMT |
| 167 Feature | 77 | 80 | 80.2 | 97.4 | 97.6 | 98 | 97.8 | 97.2 | 68.4 | 96 |
| 75 Features | 78.2 | 78.6 | 94.2 | 97.8 | 97.8 | 97.8 | 98 | 96.8 | 68.2 | 96.4 |

FIG. 4c

METHOD OF MULTI-MODAL BIOMETRIC RECOGNITION USING HAND-SHAPE AND PALMPRINT

BACKGROUND

Biometric system operate by acquiring biometric data from an individual, extracting a feature set from the acquired data, and comparing this feature set against the template set in the database. Using multiple biometric modalities can overcome limitations shown by unimodal biometric system. Multimodal biometric systems integrate information presented by multiple biometric indicators. Usually, such information can be integrated at different levels, such as at the feature extraction level, the matching score level, or the decision level. The prior art has shown it is more difficult to perform combination at the feature level because the relationship between the feature spaces of different biometric systems may not be shown and the feature representations may not be compatible.

Regarding a multimodal system using palmprint and hand-shape information, existing research has not shown the fusion of such features at the feature level. Further, the prior art has not shown the utilization of feature subset algorithm, which will be useful to identity and remove redundant features.

It is an object of the present system to overcome the disadvantages and problems in the prior art.

DESCRIPTION

The present invention proposes a multimodal biometric system utilizing palmprint features and hand shape features, such system allowing the fusion of the features at the feature level.

The present invention also teaches the fusion of multi-biometric features at the feature level through the utilization of feature subset algorithm that eliminate redundant information, thus making it possible to efficiently record and store such data.

The present also features methods of multimodal biometric recognition.

These and other features, aspects, and advantages of the apparatus and methods of the present invention will become better understood from the following description, appended claims, and accompanying drawings where:

FIG. 4, in application to the Example, shows the evaluating of palmprint recognition, hand shape recognition, and combined palmprint and hand shape features.

Figure 5B:
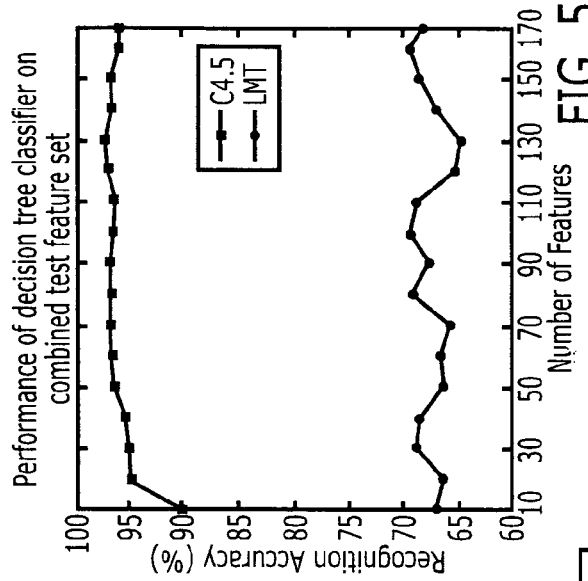
Figure 5C:
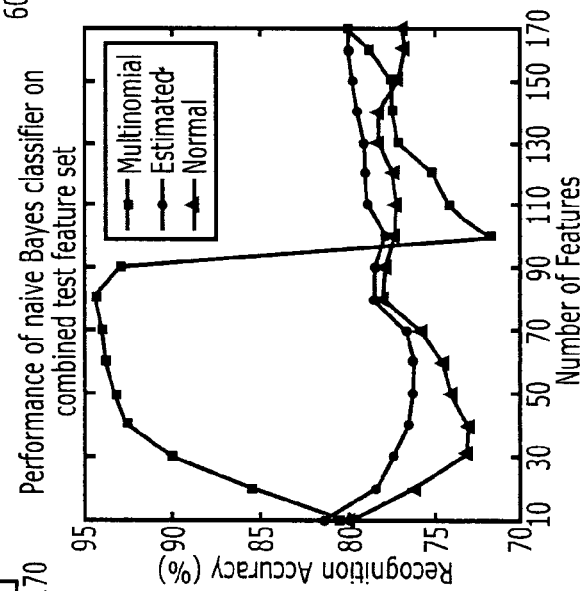
Figure 5A:
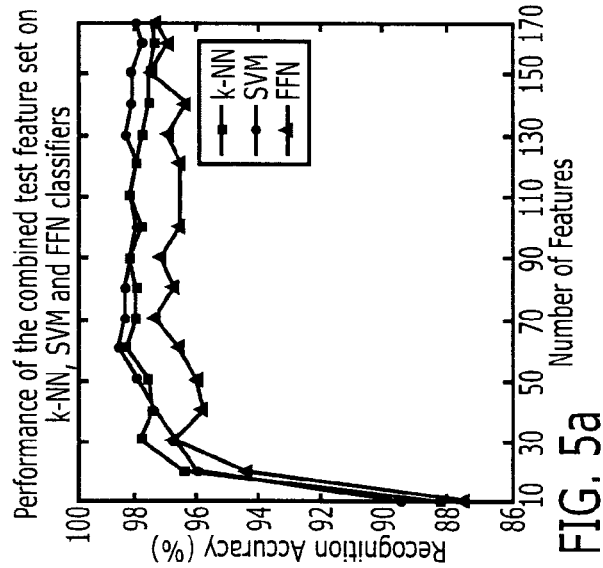

FIG. 5 shows the affect of using a feature subset in accordance with the present invention.

The following description of certain exemplary embodiment(s) is merely exemplary in nature and is in no way intended to limit the invention, its application, or uses.

Figure 1:
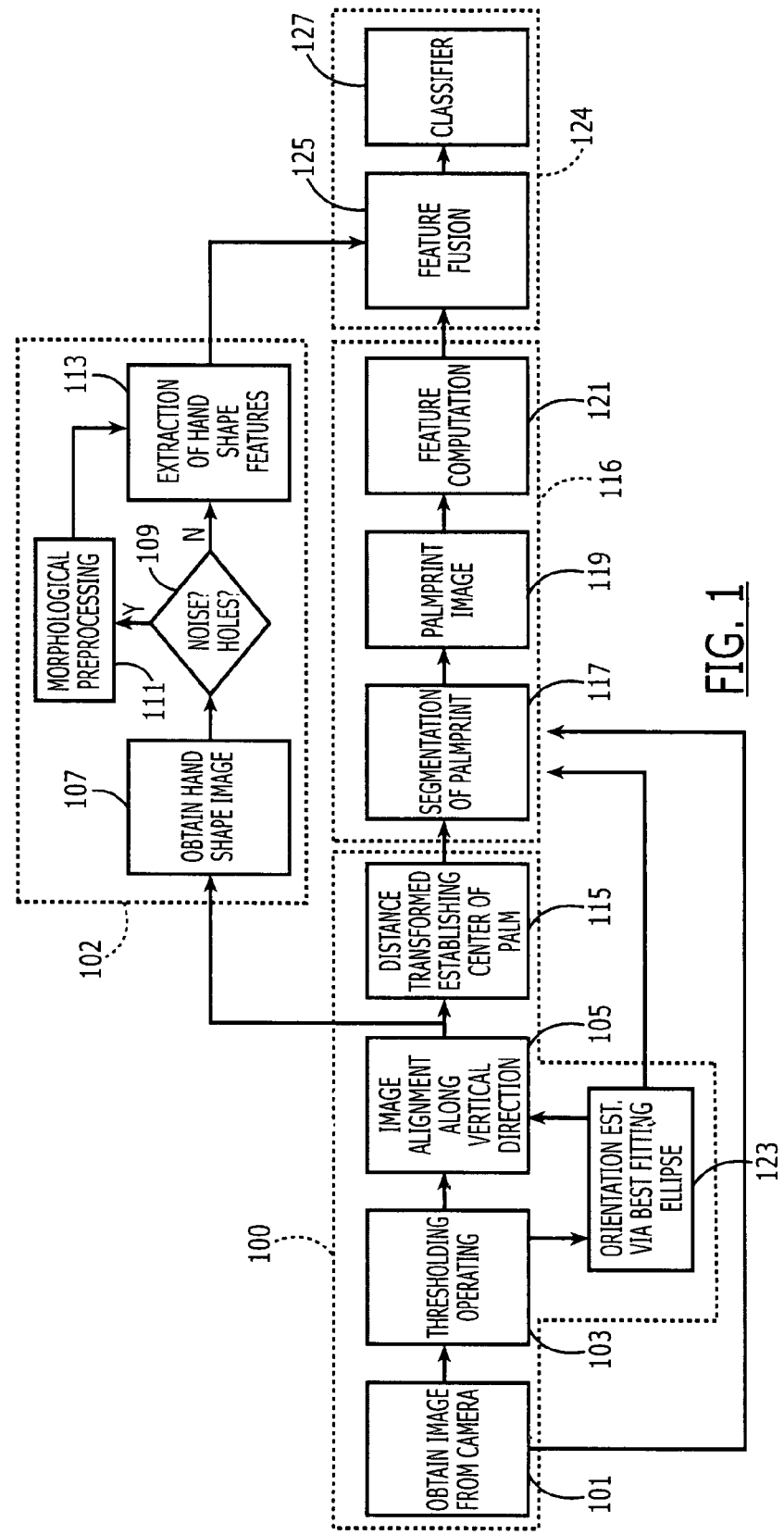
FIG. 1 shows the method of multimodal biometric recognition in accordance with the instant invention.

Now, to FIGS. 1-5,

FIG. 1 is a method of building a biometric recognition system in accordance with the instant invention, comprising the principal steps of obtaining an image 100, creating a palmprint image and feature computation 116, extracting hand shape features 102, and fusing the features 124.

The first principle step 100 contains the steps of obtaining an image using a digital camera 101, binarizing the image 103, aligning the image 105, orienting the image 123, and estimating the center of the palm 115.

In obtaining a hand image using a digital camera 101, a user will place his hand on an imaging table or platen. A digital camera such as low/medium cost, low resolution CCD camera having between 1.0 to 3.0 megapixels, would be positioned above the hand. In a preferred embodiment, the table or platen does not contain pegs for posing the digits. The users are asked to position their fingers such that they do not touch each other, and most of the back side of the hand touches the table.

The image is then binarized via a thresholding operation 103 in order to segment the image into its black and white areas. Examples of suitable thresholding operations include single variable thresholds, multilevel thresholding, global thresholding, and local thresholding. In such thresholding operation, a point(x, y) for which $f(x, y) > \eta$ is an object point (black), and other points are background (white). In one embodiment, the thresholding limit $\eta$ is chosen by maximizing the object function $J_{op}(\eta)$, which denotes the measure of separability between the two classes of pixels $$J_{op}(\eta) = \frac{P_1(\eta)P_2(\eta)[\mu_1(\eta) - \mu_2(\eta)]}{[P1(\eta) + P2(\eta)]}$$

Where the numbers of pixels in class 1 and 2 are represented by $P_1(\eta)$, and $P_2(\eta)$, $\mu_1(\eta)$, and $\mu_2(\eta)$ are the corresponding sample method. The magnitude of $\eta$ that maximizes $J_{op}(\eta)$ is selected to be the thresholding limit.

Following the thresholding operation, the binarized image is more vertically aligned 105. Vertical alignment may occur through the use of a matrix operator. The matrix operator is preferably a rotation matrix, whereby it is orthogonal and the determination is unity (+1). In one embodiment, the matrix $\Omega$ is represented by $$\begin{bmatrix} \cos(\theta) & \sin(\theta) \\ \sin(\theta) & \cos(\theta) \end{bmatrix}$$

In another embodiment, $\Omega$ is represented by $$\begin{bmatrix} \cos(\theta) & -\sin(\theta) \\ \sin(\theta) & \cos(\theta) \end{bmatrix}$$

The orientation ($\theta$), as well as the location, of the binarized image can be estimated 123 prior to vertical alignment. Various generated shapes may be utilized to determine the orientation of the binarized image, such shapes being superimposed over the image. The superimposed shapes may be used one, or two or more in conjunction. Examples of shapes include ellipses, rectangles, windows having height, width and angle, triangles, and trapezoids. In one embodiment, an ellipse is utilized to obtain the $\theta$ of the binarized image. The method as taught in U.S. Pat. No. 5,852,669, incorporated herein by reference, is suitable for use herein. In one embodiment the counterclockwise rotation of the major axis relative to the normal axis is used to approximate the orientation $\theta$ $$\theta = \begin{cases} \tan^{-1}\left(\dfrac{\rho_{11} - \rho_{22} + \sqrt{(\rho_{11} - \rho_{22})^2 + 4\rho_{12}^2}}{-2\rho_{12}}\right), & \text{if } \rho_{11} > \rho_{22} \\ \tan^{-1}\left(\dfrac{-2\rho_{12}}{\rho_{22} - \rho_{11} + \sqrt{(\rho_{22} - \rho_{11})^2 + 4\rho_{12}^2}}\right), & \text{otherwise} \end{cases}$$

Where $P_{11}$, $P_{22}$, and $P_{12}$ are the normalized second-order moments of pixels in the image P (x,y), and $(C_x, C_y)$ denote the location of its centroid $$\rho_{11} = \frac{\sum_{(x,y)\in P}(y - c_y)^2 \cdot I(x, y)}{\sum_{(x,y)\in S} I(x, y)}$$

$$\rho_{22} = \frac{\sum_{(x,y)\in P}(x - c_x)^2 \cdot I(x, y)}{\sum_{(x,y)\in S} I(x, y)}, \text{ and}$$

$$\rho_{12} = \frac{\sum_{(x,y)\in S}(y - c_y)(x - c_x) \cdot I(x, y)}{\sum_{(x,y)\in P} I(x, y)}$$

A distance transform operator is used to establish the center of the palmprint. Using the hand shape image after rotation, the location (u,v) of the pixel with the highest magnitude of distance transform can be obtained. Suitable distance transform operation include Euclideon distance methods, Chebysler distance methods, and Manhattan distance methods. The originally obtained hand shape image 101 is then superimposed with a fixed region, such as a square or other geometrically shape region, such region centered at (u,v) and oriented along θ. The image, with region imposition and orientation, is used as the palmprint image.

During the above described principle step 100, the hand shape image is used to obtain the hand shape features 102. Following vertical alignment of the image 105, the hand shape is obtained 107. The hand shape image will be inspected for noise, holes, or other such distortions therein 109. If there are such distortions, as will be discussed later, the hand shape features will be extracted 113. If noise, holes, or other distortions are present, morphological preprocessing operators can be used to address these issues 111.

The features of the palmprint are computed 116 following the image obtaining 100. Following insertion of the orientation 123 and the obtained image 101, the palmprint is segmented 117, an image is obtained 110, and the features are computed 121. Segmentation of the palmprint image 117 can occur by various methods, including thresholding, extracting and following contours, erosion and enlargement, point and line deletion, edge detection, pixel aggregartion, region splitting, and merging. In extracting the palm features, discrete argument algorithms can be used. In particular, discrete cosine transforms (DCT) are suitable for extracting the features. Examples of DCT include DCT-1, DCT-II, DCT-III, DCT-IV, and DCT V-VIII. In one embodiment, DCT-II is used for feature extraction. In such an embodiment, the DCT is defined thusly, $$T[x, y] = \varepsilon_x \varepsilon_y \sum_{q=0}^{Q-1} \sum_{r=0}^{R-1} \Omega_{qr} \cos\frac{\pi(2q+1)x}{2Q} \times \cos\frac{\pi(2r+1)y}{2R} \quad \begin{array}{l} 0 \le x \le Q-1 \\ 0 \le y \le R-1 \end{array}$$

$$\text{where } \varepsilon_x = \begin{cases} 1/\sqrt{Q} & q = 0 \\ \sqrt{2/Q} & 1 \le q \le Q-1 \end{cases} \text{ and}$$

$$\varepsilon_y = \begin{cases} 1/\sqrt{R} & r = 0 \\ \sqrt{2/R} & 1 \le r \le R-1. \end{cases}$$

Using such DCT, the palmprint image is divided into overlapping blocks of size Q×R. The DCT coefficients, i.e. T[x,y], for each of these blocks are computed. Several of these DCT coefficients have values close to zero and can be discarded. The feature vector from every palmprint image is formed by computing standard deviation of these significant DCT in each block.

The features pertaining to the hand shape 102 and palmprint image 116 are then fused at the feature fusion level 125. However, prior to fusion, the feature can be subjected to feature subset selection algorithms, for example wrapper algorithm or correlation-based feature selection (CFS) algorithm. In one embodiment, the feature subset selection algorithm is CFS algorithm. The CFS algorithm uses a correlation-based objective function to evaluate the usefulness of the features. The objective function $J_{cfs}(\lambda)$ is based on the heuristic that a good feature subset will have high correlation with the class label but will remain uncorrelated among themselves $$J_{cfs}(\lambda) = \frac{\lambda \psi_{cr}}{\sqrt{\lambda + \lambda(\lambda - 1)\psi_{rr}}}$$

where ψ is the average feature to class correlation and $\psi_{rr}$ is the average feature to feature correlation within the class. The CFS-based feature selection algorithm use $J_{cfs}(\lambda)$ to search the feature subsets using the best first search. The search is aborted if the addition of new features does not show any improvement in the last five consecutive expanded combinations.

At the feature fusion level, the data obtained from the hand shape and the data from the palmprint image are used to compute a feature vector. The two vectors (hand shape and palmprint) are concatenated into a single vector. Whereas the prior art has reported difficulty with fusing extracted data at the feature level, the present invention overcomes such difficulty by automatically selecting features from the images. The automated selection significantly boosts the performance and reduces the online computational complexity.

Following fusion at the feature level 125, a classifier operator algorithm can be used to identify a subject 127. Classification algorithm that may be suitable for use herein include Naive Bayes classifier, which assumes that the feature vectors within a class are independent, Support Vector Machine (SVM), which are based on the idea that by increasing dimensionality of the data, the data is easier to separate, a neural network, such as Feed-Forward Neural Network (FFN), which employs a linear activation function for the last layer while the sigmoid activation function was employed for other layers, the multinomial model, the Nearest Neighbor classifier, and decision tree such as the C 4.5 decision tree, which uses entropy criteria to select the most informative features for branching, and the logistic model tree (LMT) which uses a combination of tree combination and logistic regression mould to build the decision tree; the different logistic regression function of tree leaves are built using Logi Boost algorithm. U.S. Pat. No. 6,182,058, incorporated herein by reference, teaches suitable classifiers and the uses thereof.

The present invention also teaches a multimodal biometric system comprising a digital camera connected to a controller, and a table or platen. The digital camera, as previously disclosed, is preferably a low-cost modal possessing from 1.0 to 3.0 mega pixels. The camera may be wired or wirelessly connected to said controller. The controller may contain a processor, memory storage, display user interface devices, etc. The memory storage may have stored thereon operating algorithms for the controller itself, as well as subroutines, said subroutines which may consist of the various algorithms necessary for operating the biometric system, including threshold operator algorithms, alignment algorithms, orientation algorithms, distance transform operator algorithms, feature computation algorithms, segmentation algorithms, feature extraction algorithms, vector fusion algorithms, classifier algorithms, and the like. The memory may also include temporary storage area such as RAM. A display may be used for a system operator to visually view hand images. A user interface device, such as keyboard, movie, etc. can be used to interact with the system. Examples of the controller include a laptop computer, a desktop computer, or a PDA.

Figure 2:
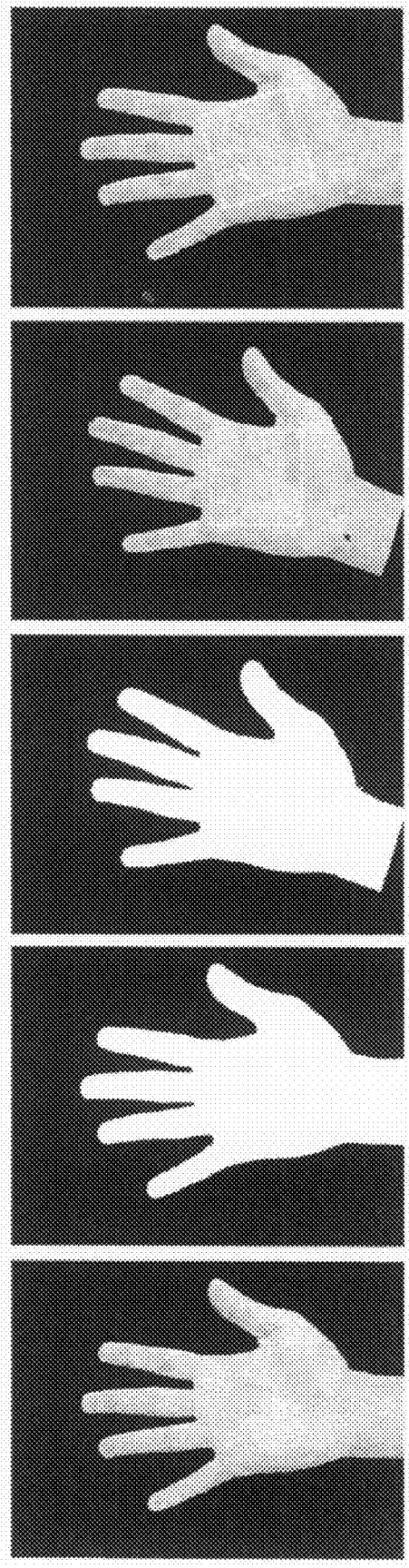
FIG. 2 shows a visual example of the method of the present invention.

FIG. 2 visually shows the generation of the palmprint features in accordance with the instant invention, whereby an image of a hand is acquired (a), the image is binarized through a thresholding operator (b) to provide the black and white areas, the binarized image is aligned vertically (c), the center of the palm is established by distance transform (d), and a region with a rotational angle (θ) is then superimposed over the original hand image (e).

Figure 3:
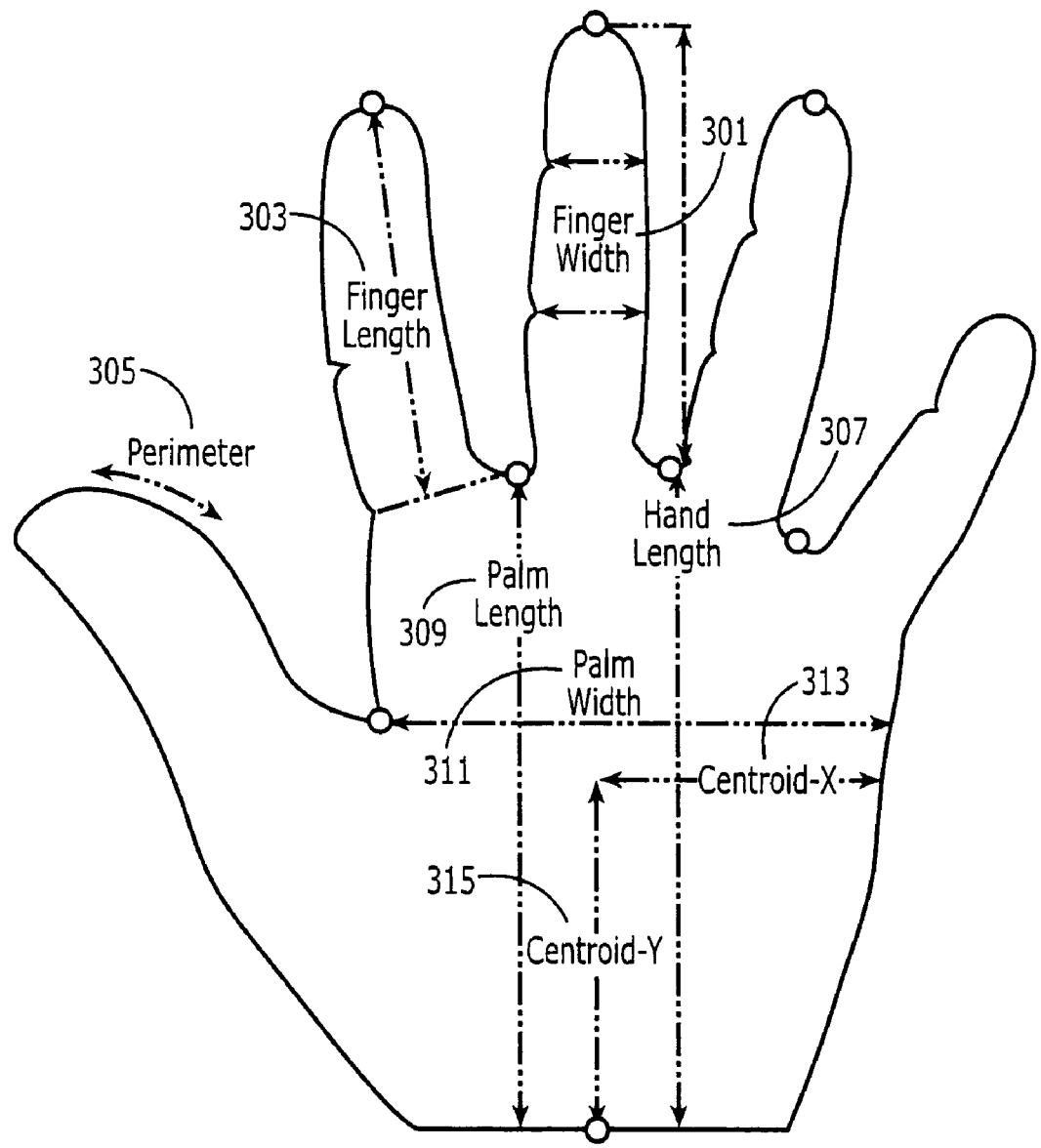
FIG. 3 shows the hand shape features to be extracted in the present invention.

FIG. 3 is a diagram of the features to be extracted from the hand shape, in accordance with the instant invention. As stated previously the features are extracted from the hand shape image, such image derived from the original camera image. Features to be extracted include the finger widths 301, the length of the fingers 303, the perimeter of the thumb 305, the length of the hand 307, the length of the palm 309, the width of the palm 311, the centroid of the hand along the x-axis 313, and the y-axis 315. The various features can be applied to all aspects of the hand, such as all 4 fingers, as opposed to being limited to one finger. In one embodiment, the thumb features are not computed due to their poor reliability. In a preferred embodiment, a hand shape is characterized by a vector of between 10 to 23 features.

EXAMPLE

A hand image database from 100 subjects was prepared. The data set consisted of 1000 images, ten images per subject. The images were obtained from a digital camera using an unconstrained peg-free setup in an indoor environment. During acquiring the images, the individuals were to make sure their fingers did not touch and the back side of their hand touched the table. The hand shape images and palmprint images were obtained in accordance with the present invention. The segmented palmprint images were 300×300 pixels, and were further divided to 24×24 pixels. A feature vector of size 1×23 from the hand shape image, and a feature vector of 1×144 from the palmprint image were extracted for feature evaluation and selection. Five image samples from every user collecting the first session were employed for training, and the rest was used for testing.

To FIG. 4, table I (a) shows the results for the palmprint recognition, applying the various classifiers. It can be seen from this table that the kernel density estimation has managed to improve naive Bayes performance, but the performance improvement is significant when multinomial event model is employed. The best performance for palmprint recognition is achieved with SVM classifiers when the second order polynomial kernel is used. However, the achieved performance of nearest neighbor classifier suggest that it may be preferred in some applications as it is inherently simple and does not require training phase. The performance of FFN is better than naive Bayes, but quite similar to that of SVM or κNN. The performance of decision tree C4.5 was the worst and this may be due to the large number of features that make the repeated portioning of data difficult. However, the performance of LMT is also promising and similar to that of κNN. The average tree size for the decision tree build using 144(51) features for LMT and C4.5 was 16(12) and 285(281), respectively. This is not surprising as LMT algorithm has shown to be often more accurate than C4.5 and always resulting in a tree of small size thank those from C4.5.

One of the important conclusions from Table I is that the usage of feature selection has effectively reduced the number of features by 52.08% while improving or maintaining similar performance in most cases. This suggests that while the majority of palmprint (DCT) features are useful in predicting the subjects identity, only a small subset of these features are necessary, in practice, for building an accurate model for identification.

Table II (b) summarizes the results for the hand shape identification, applying the various classifiers. The evaluation of 23 features from the training data has selected 15 most informative features: perimeter($f_1$), convex area($f_7$), four finger length($f_8$-$f_{11}$), finger width($f_{14}$, $f_{16}$-$_{19}$), and palm width ($f_{20}$), palm length($f_{21}$), hand area($f_{22}$), and hand length($f_{23}$). The decision tree using LMT achieved the best performance while those from the multinomial naive Bayes is the worst. The usage of the multinomial event model in naive Bayes has resulted in significant performance improvement from the palmprint fetures (TableI(a)) while the usage from hand-shape features has been degraded (Table II(b)). This can be attributed to the inappropriate estimation of the term probabilities resulting from the small size hand-shape feature vectors. The average size of decision tree build using 23(15) features using LMT and C4.5 was 81(69) and 251(255), respectively.

Table III(c) shows the results of the combined hand-shape and palmprint features. The CFS algorithm selected 75 features subset from the combined list of 167 features. The combined feature subset had 13 hand-shape features, and 62 palm-print features. It may be noted that the reduced features subset obtained from the combined feature set is not the addition or sum of reduced feature subsets individually obtained from palmprint and hand-shape feature sets. This suggests that only a certain combination of features, rather than the combination of individual feature subsets carrying the discriminatory information, is useful in the feature level fusion. The new hand-shape features selected in the individual and combined feature subsets, justify their usefulness. However, other new examined hand-shape features, could not establish their significance. As shown in Table III, the SVM classifier achieved the best performance which is closely followed by κNN. It can be noted that the combination of hand-shape and palmprint features has been useful in improving the performance for all classifiers except for the case from naive Bayes classifier. The performances of combined features from the multinomial naive Bayes classifier using feature subset selection suggests that the multinomial event model is most sensitive to irrelevant and redundant features. The size of decision tree build using 147(100) features using LMT and C4.5 was 16(12) and 285(231), respectively. The best results for κNN are obtained when κ=1 and has been used in Tables I-III.

FIG. 5 shows how the performance of various classifiers is adversely affected by the irrelevant and redundant features. In this set of experiments, all the available features from the training samples were ranked in the order of their merit using CFS objective functions. The feature vectors in the test data set were also ranked in the same order of ranking generated from the training data. The performance of these classifiers starting from first ten features was computed and the next ten features were added at every successive iterations. The number of input nodes for FFN classifier was empirically fixed to 75, irrespective of number of features. (a) shown the performance variation for κNN, SVM, and FFN classifiers with the increase in number of features. The SVM classifier does not show any appreciable increase in the performance with the addition of irrelevant features (say beyond 75) and its performance is generally the best of all the classifiers evaluated in this paper. It is interesting to note that the feature selection strategy has been able to find 20(10) best features that give •96%(89%) accuracy using the SVM classifier. This 20(10) feature subset consists of 15(6) palmprint and 5(4) hand-shape features.

The performance of the LMT classifier in (b) shows an initial increase in performance with the increase in informative features, but the performance stabilizes with the addition of noninformative and redundant features (beyond 70-75). Thus, the performance of LMT suggests that it is insensitive to the redundant and irrelevant features, and this is due to the fact that the LMT is built using the stagewise fitting process to construct the logistic regression models which select only relevant features from the training data. The C4.5 decision tree continues to maintain worse performance and the feature selection strategy do not have any appreciable effect on the performance. (c) shows the results for the performance of naive Bayes classifier. The performance estimates of the naive Bayes multinomial classifier shows a tendency of exponential increase with a small number of features before an abrupt decrease in performance. The performance of the naive Bayes with nonparametric kernel estimations is marginally better than those with normal assumption, but is still quite poor.

Having described embodiments of the present system with reference to the accompanying drawings, it is to be understood that the present system is not limited to the precise embodiments, and that various changes and modifications may be effected therein by one having ordinary skill in the art without departing from the scope or spirit as defined in the appended claims.

In interpreting the appended claims, it should be understood that:

a) the word "comprising" does not exclude the presence of other elements or acts than those listed in the given claim;

b) the word "a" or "an" preceding an element does not exclude the presence of a plurality of such elements;

c) any reference signs in the claims do not limit their scope;

d) any of the disclosed devices or portions thereof may be combined together or separated into further portions unless specifically stated otherwise; and e) no specific sequence of acts or steps is intended to be required unless specifically indicated.

The invention claimed is:

1. A method of multi-modal biometric recognition, comprising the steps of:
    capturing a hand image of a user by using a digital camera;
    transforming the captured hand image into a digitized image by the digital camera;
    binarizing said digitized image;
    obtaining an orientational angle θ and location information of said binarized image;
    vertically aligning said binarized image, based on the orientational angle θ and the location information from binarized shape moments, using a rotation matrix;
    establishing a geometrical center of a palmprint image of said vertically aligned image based on selected pixel(s) with highest magnitude of distance transform;
    segmenting said palmprint image;
    extracting palmprint feature vectors of said palmprint image using discrete cosine transform;
    obtaining a hand shape image from said vertically aligned image, and extracting hand shape feature vectors from localized information of the hand shape image;
    selecting a subset of the hand shape feature vectors and a subset of the palmprint feature vectors;
    fusing the subset of said hand shape feature vectors and the subset of said palmprint feature vectors to form a fused feature vector; and
    classifying said fused feature vector.

2. The method of biometric recognition in claim 1, wherein capturing said hand image comprises positioning the user's hand on a peg-free table.

3. The method of biometric recognition in claim 1, wherein binarizing said digitized image comprises utilizing a threshold operator.

4. The method of biometric recognition of claim 1, wherein the localized information of the hand shape image include the features of finger widths, length of the fingers, the perimeter of the thumb, the length of the hand, length of the palm, width of the palm, and centroid of hand along the x- and y-axis.

5. The method of biometric recognition of claim 1, wherein said discrete cosine transform (DCT) is selected from the group comprising DCT-I, DCT-II, DCT-III, DCT-IV, and DCT-V through DCT-VIII.

6. The method biometric recognition of claim 1, wherein selecting the subset of the hand shape feature vectors and the subset of the palmprint feature vectors occurs via a correlation-based feature vector selection algorithm or a wrapper algorithm.

7. The method of biometric recognition of claim 6, wherein selecting the subset of the hand shape feature vectors and the subset of the palmprint feature vectors includes selecting between 10 to 23 feature vectors.

8. The method of biometric recognition of claim 1, wherein classifying said fused feature vector occurs through the use of classifier operators selected from a group consisting of naive Bayes, Support Vector Machine, newel network, multinomial model, nearest neighbor, and decision tree.

* * * * *